US012518687B2

(12) United States Patent
Feng et al.

(10) Patent No.: US 12,518,687 B2
(45) Date of Patent: Jan. 6, 2026

(54) PIXEL CIRCUIT, PIXEL UNIT, AND DRIVING METHOD

(71) Applicants: Hefei BOE Joint Technology Co., Ltd., Hefei (CN); Beijing BOE Technology Development Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/876,411

(22) PCT Filed: Dec. 18, 2024

(86) PCT No.: PCT/CN2024/082638

§ 371 (c)(1),
(2) Date: Dec. 18, 2024

(65) Prior Publication Data

US 2025/0342792 A1 Nov. 6, 2025

(51) Int. Cl.
*G09G 3/32* (2016.01)

(52) U.S. Cl.
CPC ......... *G09G 3/32* (2013.01); *G09G 2300/043* (2013.01); *G09G 2310/08* (2013.01); *G09G 2320/0247* (2013.01)

(58) Field of Classification Search
CPC ............... G09G 3/32; G09G 2300/043; G09G 2310/08; G09G 2320/0247
See application file for complete search history.

(56) References Cited

U.S. PATENT DOCUMENTS

| | | | | |
|---|---|---|---|---|
| 11,322,087 | B1 | 5/2022 | Beard et al. | |
| 2014/0292625 | A1 | 10/2014 | Lee et al. | |
| 2022/0101776 | A1* | 3/2022 | Wu .......................... | G09G 3/32 |
| 2022/0101781 | A1* | 3/2022 | Baumheinrich ......... | G09G 3/32 |

FOREIGN PATENT DOCUMENTS

| | | | |
|---|---|---|---|
| CN | 109087609 | A | 12/2018 |
| CN | 109523956 | A | 3/2019 |
| CN | 110610683 | A | 12/2019 |
| CN | 114023261 | A | 2/2022 |
| CN | 114648929 | A | 6/2022 |
| CN | 117037656 | A | 11/2023 |

* cited by examiner

*Primary Examiner* — Andrew Sasinowski
(74) *Attorney, Agent, or Firm* — Westman, Champlin & Koehler, P.A.

(57) ABSTRACT

A pixel circuit, a pixel unit and a method for driving a pixel circuit. The pixel circuit includes: a driving circuit (110, 210), a writing circuit, a light-emitting control circuit, a first compensation circuit, and a second compensation circuit. The first compensation circuit is configured to electrically couple or decouple a control terminal of the driving circuit to/from a first terminal of the driving circuit according to a signal of a second control signal terminal of the pixel circuit. The second compensation circuit is configured to provide a voltage of a first voltage terminal of the pixel circuit to an output signal terminal of the pixel circuit under control of a third control signal terminal of the pixel circuit, and to electrically couple or decouple the output signal terminal to/from the control terminal of the driving circuit, according to a signal of a fourth control signal terminal of the pixel circuit.

20 Claims, 10 Drawing Sheets

400

600

PIXEL CIRCUIT, PIXEL UNIT, AND DRIVING METHOD

CROSS REFERENCE TO RELATED APPLICATION(S)

This application is a Section 371 National Stage Application of International Application No. PCT/CN2024/082638, filed on Mar. 20, 2024, entitled "PIXEL CIRCUIT, PIXEL UNIT. AND DRIVING METHOD", which is incorporated herein by reference in its entirety.

TECHNICAL FIELD

The present disclosure relates to a field of display technology, and in particular, to a pixel circuit, a pixel unit, and a driving method.

BACKGROUND

Oxide processes are usually used in display fields due to the high uniformity thereof. However, the threshold voltage drift in the pixel circuits may have adverse effects on display. This problem may be alleviated through internal compensation of the pixel circuits, which poses significant challenges to the design of the pixel circuits.

SUMMARY

According to an aspect of the present disclosure, a pixel circuit is provided, including: a driving circuit including a control terminal, a first terminal, and a second terminal, and configured to generate a driving current flowing through the second terminal of the driving circuit: a writing circuit coupled to a data signal terminal of the pixel circuit, a first control signal terminal of the pixel circuit, and the second terminal of the driving circuit, and configured to provide a signal of the data signal terminal to the second terminal of the driving circuit under control of the first control signal terminal; a light-emitting control circuit coupled to a first light-emitting signal terminal of the pixel circuit, a second light-emitting signal terminal of the pixel circuit, a power signal terminal of the pixel circuit, an output signal terminal of the pixel circuit, the first terminal of the driving circuit, and the second terminal of the driving circuit, and configured to electrically couple the first terminal of the driving circuit to the power signal terminal under control of the first light-emitting signal terminal, and to electrically couple the second terminal of the driving circuit to the output signal terminal under control of the second light-emitting signal terminal; a first compensation circuit coupled between the control terminal of the driving circuit and the first terminal of the driving circuit and coupled to a second control signal terminal of the pixel circuit, and configured to electrically couple the control terminal of the driving circuit and the first terminal of the driving circuit or decouple the control terminal of the driving circuit from the first terminal of the driving circuit according to a signal of the second control signal terminal; and a second compensation circuit coupled between the control terminal of the driving circuit and the output signal terminal and coupled to a first voltage terminal of the pixel circuit, a third control signal terminal of the pixel circuit, and a fourth control signal terminal of the pixel circuit, and configured to provide a voltage of the first voltage terminal to the output signal terminal under control of the third control signal terminal, and to electrically couple the output signal terminal to the control terminal of the driving circuit or decouple the output signal terminal from the control terminal of the driving circuit according to a signal of the fourth control signal terminal.

For example, the second compensation circuit includes: a first sub-circuit coupled to the first voltage terminal, the output signal terminal, and the third control signal terminal, and configured to provide the voltage of the first voltage terminal to the output signal terminal under control of the third control signal terminal; and a second sub-circuit coupled between the control terminal of the driving circuit and the output signal terminal and coupled to the fourth control signal terminal, and configured to electrically couple the output signal terminal to the control terminal of the driving circuit or electrically decouple the output signal terminal from the control terminal of the driving circuit, according to the signal of the fourth control signal terminal.

For example, the second sub-circuit includes a first transistor and a first capacitor, the first transistor and the first capacitor are coupled in series between the control terminal of the driving circuit and the output signal terminal, and a gate of the first transistor is coupled to the fourth control signal terminal.

For example, a first electrode of the first transistor is coupled to the control terminal of the driving circuit, a second electrode of the first transistor is coupled to a first electrode of the first capacitor, and a second electrode of the first capacitor is coupled to the output signal terminal.

For example, a first electrode of the first capacitor is coupled to the control terminal of the driving circuit, a second electrode of the first capacitor is coupled to a first electrode of the first transistor, and a second electrode of the first transistor is coupled to the output signal terminal.

For example, the first sub-circuit includes a second transistor, a gate of the second transistor is coupled to the third control signal terminal, a first electrode of the second transistor is coupled to the first voltage terminal, and a second electrode of the second transistor is coupled to the output signal terminal.

For example, the second electrode of the second transistor is coupled to the output signal terminal through the first transistor; and the second electrode of the second transistor is coupled to a first electrode of the first transistor, a second electrode of the first transistor is coupled to the output signal terminal, a first electrode of the first capacitor is coupled to the control terminal of the driving circuit, and a second electrode of the first capacitor is coupled to the first electrode of the first transistor.

For example, the pixel circuit further includes a third compensation circuit coupled to a second voltage terminal of the pixel circuit, a fifth control signal terminal of the pixel circuit, and the first terminal of the driving circuit, and configured to provide a voltage of the second voltage terminal to the first terminal of the driving circuit under control of the fifth control signal terminal.

For example, the third compensation circuit includes a third transistor, a gate of the third transistor is coupled to the fifth control signal terminal, a first electrode of the third transistor is coupled to the second voltage terminal, and a second electrode of the third transistor is coupled to the first terminal of the driving circuit.

For example, the third control signal terminal and the fourth control signal terminal are separated from each other so as to receive a third control signal and a fourth control signal, respectively; or the third control signal terminal and the fourth control signal terminal are coupled to each other so as to receive a third control signal.

For example, the first compensation circuit includes a fourth transistor, a gate of the fourth transistor is coupled to the second control signal terminal, a first electrode of the fourth transistor is coupled to the first terminal of the driving circuit, and a second electrode of the fourth transistor is coupled to the control terminal of the driving circuit.

For example, the light-emitting control circuit includes a fifth transistor and a sixth transistor; a gate of the fifth transistor is coupled to the first light-emitting signal terminal, a first electrode of the fifth transistor is coupled to the power signal terminal, and a second electrode of the fifth transistor is coupled to the first terminal of the driving circuit; and a gate of the sixth transistor is coupled to the second light-emitting signal terminal, a first electrode of the sixth transistor is coupled to the second terminal of the driving circuit, and a second electrode of the sixth transistor is coupled to the output signal terminal.

For example, the writing circuit includes a seventh transistor, a gate of the seventh transistor is coupled to the first control signal terminal, a first electrode of the seventh transistor is coupled to the data signal terminal, and a second electrode of the seventh transistor is coupled to the second terminal of the driving circuit.

For example, the driving circuit includes a driving transistor and a second capacitor, a gate of the driving transistor serves as the control terminal of the driving circuit, a first electrode of the driving transistor serves as the first terminal of the driving circuit, and a second electrode of the driving transistor serves as the second terminal of the driving circuit; and a first electrode of the second capacitor is coupled to the gate of the driving transistor, and a second electrode of the second capacitor is coupled to the second electrode of the driving transistor.

According to another aspect of the present disclosure, a pixel unit is provided, including the pixel circuit as described above and a light-emitting unit.

According to another aspect of the present disclosure, a method for driving the pixel circuit as described above is provided, including: in a compensation phase, electrically coupling the second terminal of the driving circuit to the output signal terminal by the light-emitting control circuit, electrically coupling the control terminal of the driving circuit to the first terminal of the driving circuit by the first compensation circuit, and providing the voltage of the first voltage terminal to the output signal terminal and electrically coupling the output signal terminal to the control terminal of the driving circuit by the second compensation circuit; in a writing phase, decoupling the control terminal of the driving circuit from the first terminal of the driving circuit by the first compensation circuit, decoupling the second terminal of the driving circuit from the output signal terminal by the light-emitting control circuit, and providing the signal of the data signal terminal to the second terminal of the driving circuit by the writing circuit; and in a light-emitting phase, decoupling the first voltage terminal from the output signal terminal and decoupling the output signal terminal from the control terminal of the driving circuit by the second compensation circuit, electrically coupling the first terminal of the driving circuit to the power signal terminal and electrically coupling the second terminal of the driving circuit to the output signal terminal by the light-emitting control circuit, and generating the driving current flowing through the second terminal of the driving circuit by the driving circuit.

For example, the method further includes: in a reset phase before the compensation phase, electrically coupling the second terminal of the driving circuit to the output signal terminal by the light-emitting control circuit, electrically coupling the control terminal of the driving circuit to the first terminal of the driving circuit by the first compensation circuit, and providing the voltage of the first voltage terminal to the output signal terminal and electrically coupling the output signal terminal to the control terminal of the driving circuit, by the second compensation circuit.

For example, the method further includes: in the reset phase, electrically coupling, by the light-emitting control circuit, the power signal terminal to the first terminal of the driving circuit.

For example, the pixel circuit further includes a third compensation circuit, and the method further includes: in the reset phase, decoupling, by the light-emitting control circuit, the power signal terminal from the first terminal of the driving circuit; and providing, by the third compensation circuit, a voltage of a second voltage terminal to the first terminal of the driving circuit.

For example, the third control signal terminal and the fourth control signal terminal are separated from each other so as to receive a third control signal and a fourth control signal, respectively; and in the light-emitting phase, the second compensation circuit decouples the first voltage terminal from the output signal terminal according to the third control signal, and decouples the output signal terminal from the control terminal of the driving circuit according to the fourth control signal.

For example, in the light-emitting phase, the second compensation circuit decouples the output signal terminal from the control terminal of the driving circuit before decoupling the first voltage terminal from the output signal terminal.

For example, the third control signal terminal and the fourth control signal terminal are coupled to each other so as to receive a third control signal; and in the light-emitting phase, the second compensation circuit decouples the first voltage terminal from the output signal terminal according to third control signal, and decouples the output signal terminal from the control terminal of the driving circuit according to the third control signal.

DETAILED DESCRIPTION OF EMBODIMENTS

Although the present disclosure will be fully described with reference to accompanying drawings containing preferred embodiments of the present disclosure, it should be understood that those of ordinary skill in the art may modify the disclosure described herein while obtaining the technical effects of the present disclosure. Therefore, it should be understood that the above description is a broad disclosure for those of ordinary skill in the art, and its content is not intended to limit exemplary embodiments described in the present disclosure.

In addition, in the following detailed description, for the convenience of explanation, many specific details are set forth to provide a comprehensive understanding of embodiments of the present disclosure. However, clearly, one or more embodiments may be implemented without these specific details. In other cases, well-known structures and devices are illustrated to simplify the accompanying drawings.

Figure 1:
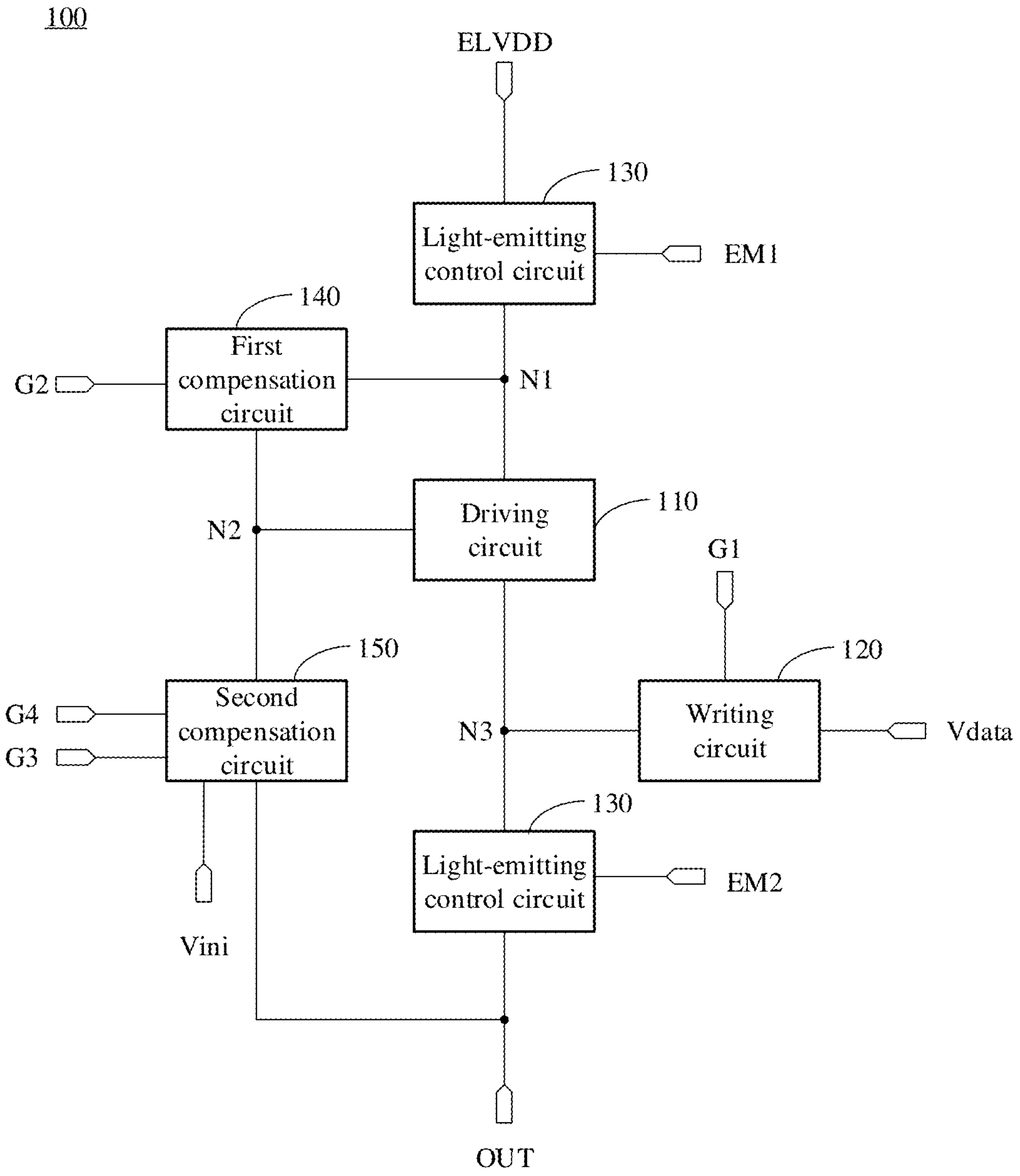
FIG. 1 shows a schematic block diagram of a pixel circuit according to an embodiment of the present disclosure.

FIG. 1 shows a schematic block diagram of a pixel circuit according to an embodiment of the present disclosure.

As shown in FIG. 1, the pixel circuit 100 includes a driving circuit 110, a writing circuit 120, a light-emitting control circuit 130, a first compensation circuit 140, and a second compensation circuit 150.

The driving circuit 110 includes a control terminal N2, a first terminal N1, and a second terminal N3. The driving circuit 110 may generate a driving current flowing through the second terminal N3.

The writing circuit 120 is coupled to a data signal terminal Vdata of the pixel circuit, a first control signal terminal G1 of the pixel circuit, and the second terminal N3 of the driving circuit 110. The writing circuit 120 may provide a signal of the data signal terminal Vdata to the second terminal N3 of the driving circuit 110 under control of the first control signal terminal G1.

The light-emitting control circuit 130 is coupled to a first light-emitting signal terminal EM1 of the pixel circuit, a second light-emitting signal terminal EM2 of the pixel circuit, a power signal terminal ELVDD of the pixel circuit, an output signal terminal OUT of the pixel circuit, the first terminal N1 of the driving circuit 110, and the second terminal N3 of the driving circuit 110. The light-emitting control circuit 130 may electrically couple the first terminal N1 of the driving circuit 110 to the power signal terminal ELVDD under control of the first light-emitting signal terminal EM1, and electrically couple the second terminal N3 of the driving circuit 110 to the output signal terminal OUT under control of the second light-emitting signal terminal EM2.

The first compensation circuit 140 is coupled between the control terminal N2 of the driving circuit 110 and the first terminal N1 of the driving circuit 110 and coupled to the second control signal terminal G2 of the pixel circuit. The first compensation circuit 140 may electrically couple the control terminal N2 of the driving circuit 110 to the first terminal N1 of the driving circuit 110 or electrically decouple the control terminal N2 of the driving circuit 110 from the first terminal N1 of the driving circuit 110, according to a signal of the second control signal terminal G2.

The second compensation circuit 150 is coupled between the control terminal N2 of the driving circuit 110 and the output signal terminal OUT and coupled to a first voltage terminal Vini of the pixel circuit, a third control signal terminal G3 of the pixel circuit, and a fourth control signal terminal G4 of the pixel circuit. The second compensation circuit 150 may provide a voltage of the first voltage terminal Vini to the output signal terminal OUT under control of the third control signal terminal G3, and electrically couple the output signal terminal OUT to the control terminal N2 of the driving circuit 110 or electrically decouple the output signal terminal OUT from the control terminal N2 of the driving circuit 110 according to a signal of the fourth control signal terminal G4. In some embodiments, the second compensation circuit 150 may include a first sub-circuit and a second sub-circuit. The first sub-circuit is coupled to the first voltage terminal, the output signal terminal, and the third control signal terminal. The first sub-circuit may provide the signal of the first voltage terminal to the output signal terminal under control of the third control signal terminal. The second sub-circuit is coupled between the control terminal of the driving circuit and the output signal terminal and coupled to the fourth control signal terminal. The second sub-circuit may control the electrical coupling and the decoupling between the output signal terminal and the control terminal of the driving circuit according to the signal of the fourth control signal terminal.

In some embodiments, the pixel circuit may further include a third compensation circuit. The third compensation circuit is coupled to a second voltage terminal of the pixel circuit, a fifth control signal terminal of the pixel circuit, and the first terminal of the driving circuit. The third compensation circuit may provide a voltage of the second voltage terminal to the first terminal of the driving circuit under control of the fifth control signal terminal.

In some embodiments, the third control signal terminal G3 and the fourth control signal terminal G4 may be separated from each other so as to receive a third control signal and a fourth control signal, respectively. In other embodiments, the third control signal terminal G3 and the fourth control signal terminal G4 may be coupled to each other so as to receive the same control signal, such as receiving a third control signal.

Embodiments of the present disclosure provide a pixel circuit. By providing a first compensation circuit and a second compensation circuit, fast compensation for threshold voltage loss may be achieved. By providing the second compensation circuit, it is possible to reset the output signal terminal by using the voltage of the first voltage terminal before the light-emitting phase, and decouple the output signal terminal from the driving circuit in the light-emitting phase. In this way, it is possible to prevent the output of the driving circuit from being affected by the voltage of the output signal terminal in the light-emitting phase.

Figure 2:
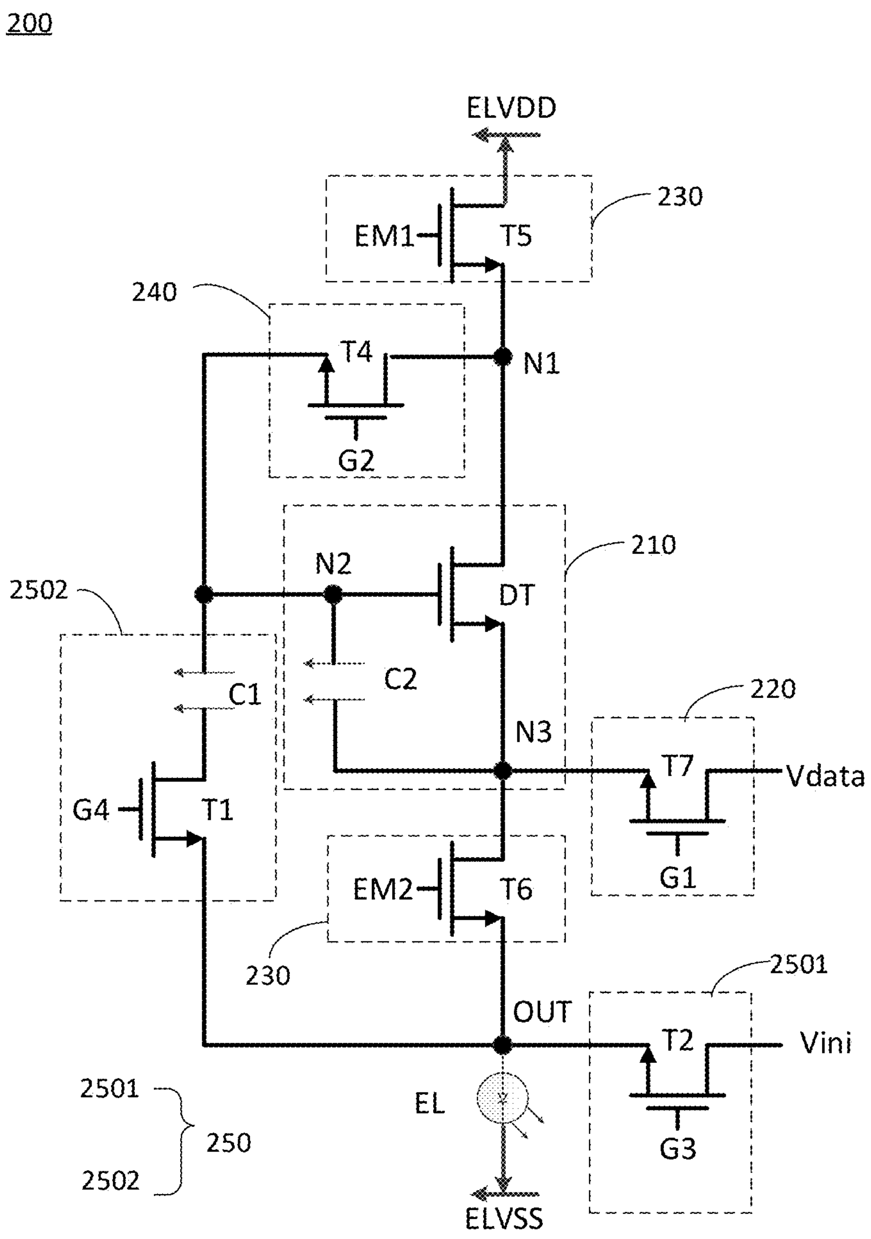
FIG. 2 shows a circuit diagram of a pixel circuit according to an embodiment of the present disclosure.

FIG. 2 shows a circuit diagram of a pixel circuit according to an embodiment of the present disclosure.

As shown in FIG. 2, the pixel circuit 200 includes a driving circuit 210, a writing circuit 220, a light-emitting control circuit 230, a first compensation circuit 240, and a second compensation circuit 250. The description of the driving circuit 110, writing circuit 120, light-emitting control circuit 130, first compensation circuit 140, and second compensation circuit 150 in above embodiments is also applicable to this embodiment.

The driving circuit 210 may include a driving transistor DT and a second capacitor C2. For example, a gate of the driving transistor DT may serve as the control terminal N2 of the driving circuit 210, a first electrode of the driving transistor DT may serve as the first terminal N1 of the driving circuit 210, and a second electrode of the driving transistor DT may serve as the second terminal N3 of the driving circuit 210. A first electrode of the second capacitor C2 may be coupled to the gate of the driving transistor DT, and a second electrode of the second capacitor C2 may be coupled to the second electrode of the driving transistor DT. The driving transistor DT may be an N-type transistor, and the first electrode of the driving transistor DT may be a source, and the second electrode of the driving transistor DT may be a drain. However, embodiments of the present disclosure are not limited to this. In some embodiments, the driving transistor may also be a P-type transistor. The driving transistor DT may generate a driving current according to a gate-source voltage of the driving transistor DT, and a magnitude of the generated driving current.

The writing circuit 220 may include a seventh transistor T7. As shown in FIG. 2, a gate of the seventh transistor T7 is coupled to the first control signal terminal G1, a first electrode of the seventh transistor T7 is coupled to the data signal terminal Vdata, and a second electrode of the seventh transistor T7 is coupled to the second terminal N3 of the driving circuit.

The light-emitting control circuit 230 may include a fifth transistor T5 and a sixth transistor T6. As shown in FIG. 2, a gate of the fifth transistor T5 is coupled to the first light-emitting signal terminal EM1, a first electrode of the fifth transistor T5 is coupled to the power signal terminal ELVDD, and a second electrode of the fifth transistor T5 is coupled to the first terminal N1 of the driving circuit. A gate of the sixth transistor T6 is coupled to the second light-emitting signal terminal EM2, a first electrode of the sixth transistor T6 is coupled to the second terminal N3 of the driving circuit, and a second electrode of the sixth transistor T6 is coupled to the output signal terminal OUT.

The first compensation circuit 240 may include a fourth transistor T4. As shown in FIG. 2, a gate of the fourth transistor T4 is coupled to the second control signal terminal G2, a first electrode of the fourth transistor T4 is coupled to the first terminal N1 of the driving circuit, and a second electrode of the fourth transistor T4 is coupled to the control terminal N2 of the driving circuit. When the fourth transistor T4 is turned on, the control terminal N2 of the driving circuit is electrically coupled to the first terminal N1 of the driving circuit. When the fourth transistor T4 is turned off, the control terminal N2 of the driving circuit is decoupled from the first terminal of the driving circuit.

The second compensation circuit 250 may include a first sub-circuit 2501 and a second sub-circuit 2502.

As shown in FIG. 2, the first sub-circuit 2501 may be coupled to the first voltage terminal Vini, the output signal terminal OUT, and the third control signal terminal G3. The first sub-circuit 2501 may provide a signal of the first voltage terminal Vini to the output signal terminal OUT under control of the third control signal terminal G3. For example, the first sub-circuit 2501 may include a second transistor T2, a gate of the second transistor T2 is coupled to the third control signal terminal G3, a first electrode of the second transistor T2 is coupled to the first voltage terminal Vini, and a second electrode of the second transistor T2 is coupled to the output signal terminal OUT.

As shown in FIG. 2, the second sub-circuit 2502 is coupled between the control terminal N2 of the driving circuit and the output signal terminal OUT and coupled to the fourth control signal terminal G4. The second sub-circuit 2502 may control the electrical coupling and the decoupling between the output signal terminal OUT and the control terminal N2 of the driving circuit according to a signal of the fourth control signal terminal G4. For example, the second sub-circuit 2502 may include a first transistor T1 and a first capacitor C1. The first transistor T1 and the first capacitor C1 are coupled in series between the control terminal N2 of the driving circuit and the output signal terminal OUT. A gate of the first transistor T1 is coupled to the fourth control signal terminal G4. As shown in FIG. 2, a first electrode of the first capacitor C1 is coupled to the control terminal N2 of the driving circuit, a second electrode of the first capacitor C1 is coupled to a first electrode of the first transistor T1, and a second electrode of the first transistor T1 is coupled to the output signal terminal OUT.

When the first transistor T1 is turned on, the output signal terminal OUT1 is coupled to the control terminal N2 of the driving circuit through the first capacitor C1. When the first transistor T1 is turned off, the output signal terminal OUT is decoupled from the control terminal N2 of the driving circuit. When the second transistor T2 is turned on, the voltage of the first voltage terminal Vini is provided to the output signal terminal OUT. When the second transistor T2 is turned off, the first voltage terminal Vini is decoupled from the output signal terminal OUT for subsequent light-emitting control.

As shown in FIG. 2, the third control signal terminal G3 and the fourth control signal terminal G4 are separated from each other so as to receive a third control signal and a fourth control signal, respectively. However, embodiments of the present disclosure are not limited to this. In some embodiments, the third control signal terminal G3 and the fourth control signal terminal G4 may be coupled to each other to receive the third control signal, which will be described in detail below.

Figure 3:
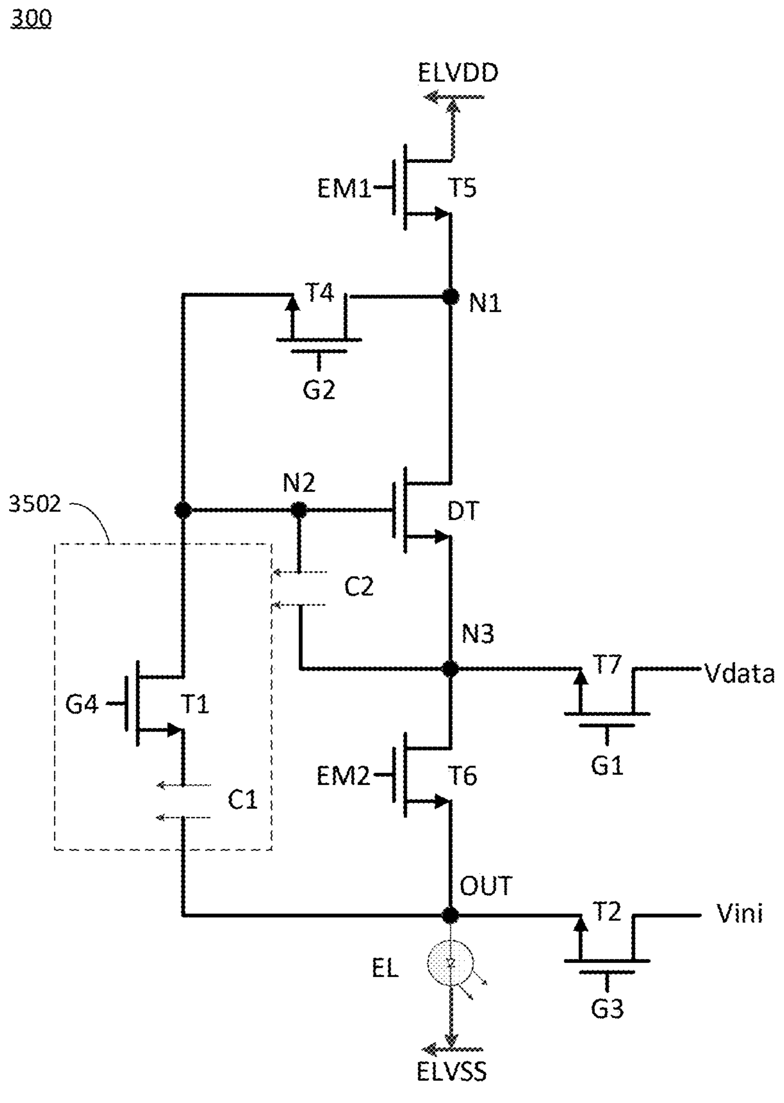
FIG. 3 shows a circuit diagram of a pixel circuit according to another embodiment of the present disclosure.

FIG. 3 shows a circuit diagram of a pixel circuit according to another embodiment of the present disclosure. The pixel circuit 300 shown in FIG. 3 is similar to the pixel circuit 200 shown in FIG. 2, except at least for the structure of the second compensation circuit. For ease of description, detailed description will be made mainly on the differences in the following.

As shown in FIG. 3, the second sub-circuit 3502 of the second compensation circuit in the pixel circuit 300 includes a first transistor T1 and a first capacitor C1. Unlike that shown in FIG. 2, a position of the first transistor T1 and a position of the first capacitor C1 are interchanged, that is, the first transistor T1 is coupled to the control terminal N2 of the driving circuit, and the first capacitor C1 is coupled to the output signal terminal OUT. As shown in FIG. 3, a first electrode of the first transistor T1 is coupled to the control terminal N2 of the driving circuit, a second electrode of the first transistor T1 is coupled to a first electrode of the first capacitor C1, and a second electrode of the first capacitor C1 is coupled to the output signal terminal OUT.

Figure 4:
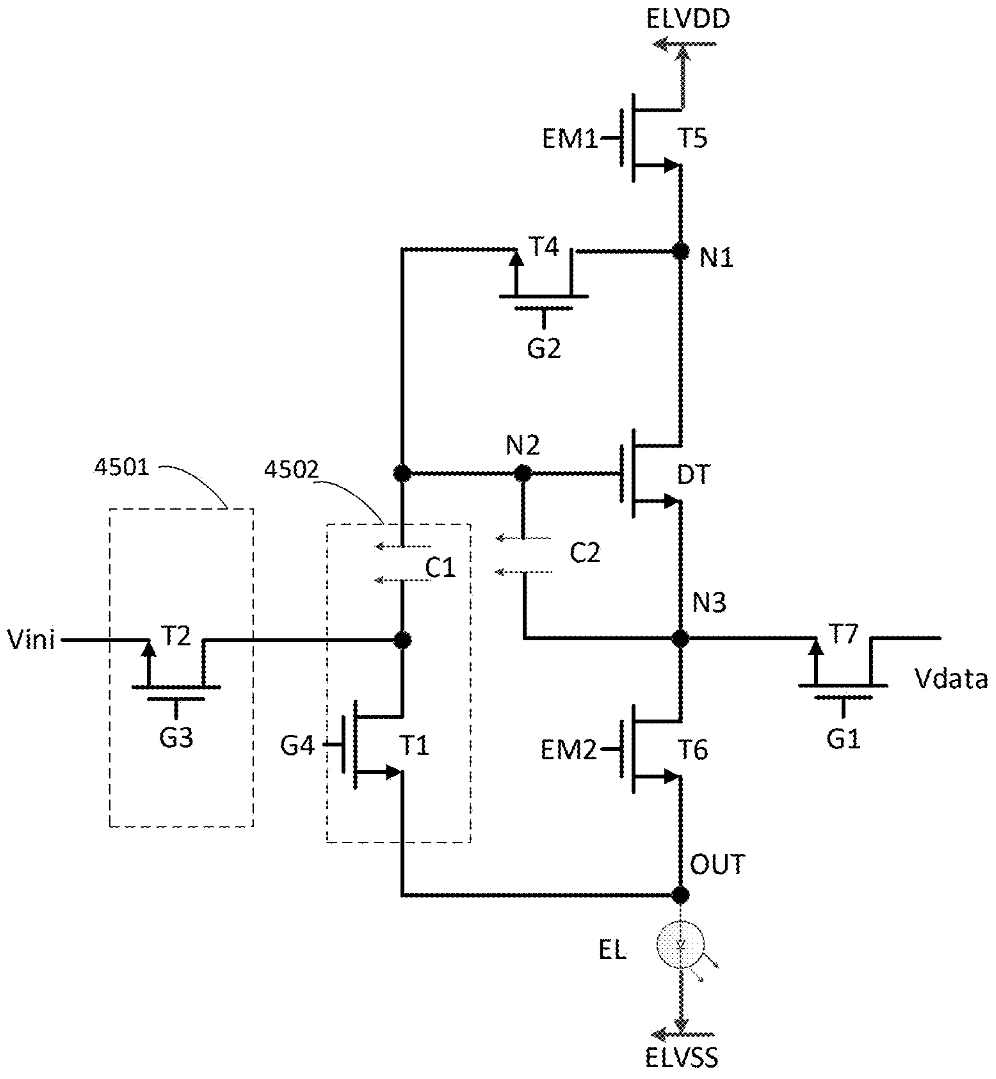
FIG. 4 shows a circuit diagram of a pixel circuit according to another embodiment of the present disclosure.

FIG. 4 shows a circuit diagram of a pixel circuit according to another embodiment of the present disclosure. The pixel circuit 400 shown in FIG. 4 is similar to the pixel circuit 200 shown in FIG. 2, except at least for the structure of the second compensation circuit. For ease of description, detailed description will be made mainly on the differences in the following.

As shown in FIG. 4, the first compensation circuit 4501 in the pixel circuit 400 includes a second transistor T2, and the second compensation circuit 4502 in the pixel circuit 400 includes a first transistor T1 and a first capacitor C1. Unlike that shown in FIG. 2, in the pixel circuit 400, a second electrode of the second transistor T2 is coupled to the output signal terminal OUT through the first transistor T1. As shown in FIG. 4, the second electrode of the second transistor T2 is coupled to a first electrode of the first transistor T1, a second electrode of the first transistor T1 is coupled to the output signal terminal OUT, a first electrode of the first capacitor C1 is coupled to the control terminal N2 of the driving circuit, and a second electrode of the first capacitor C1 is coupled to the first electrode of the first transistor T1.

When the first transistor T1 and the second transistor T2 are turned on, the voltage of the first voltage terminal Vini is provided to the output signal terminal OUT, and as the first transistor T1 is turned on, the output signal terminal OUT is electrically coupled to the control terminal N2 of the driving circuit through the first capacitor C1. When the first transistor T1 is turned off, the output signal terminal OUT is decoupled from the control terminal N2 of the driving circuit. When the second transistor T2 is turned off, the first voltage terminal Vini is decoupled from the output signal terminal OUT.

Figure 5:
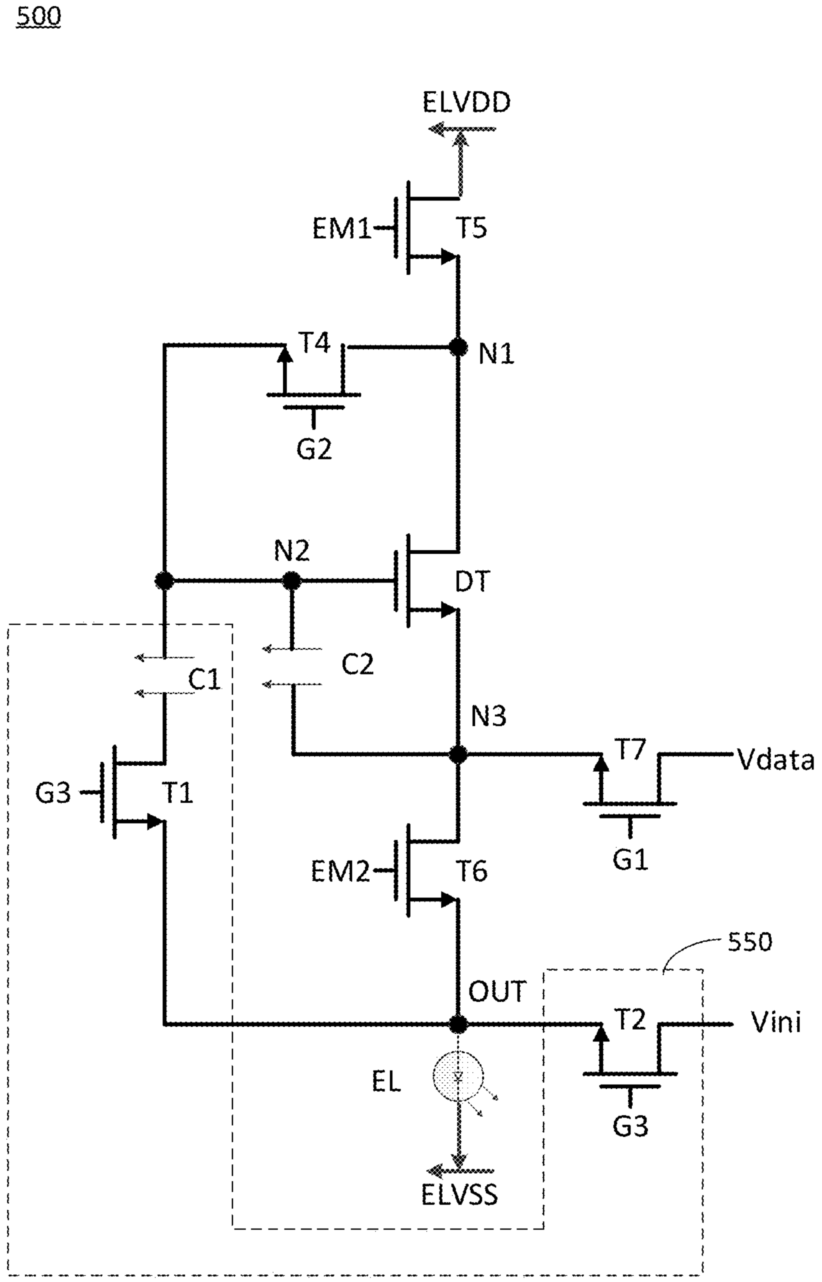
FIG. 5 shows a circuit diagram of a pixel circuit according to another embodiment of the present disclosure.

FIG. 5 shows a circuit diagram of a pixel circuit according to another embodiment of the present disclosure. The pixel circuit 500 shown in FIG. 5 is similar to the pixel circuit 200 shown in FIG. 2, except at least for the connection method of the control terminal of the second compensation circuit. For ease of description, detailed description will be made mainly on the differences in the following.

As shown in FIG. 5, unlike in FIG. 2 where the third control signal terminal G3 and the fourth control signal terminal G4 are separated from each other, in the pixel circuit 500, the third control signal terminal and the fourth control signal terminal coupled to the second compensation circuit 550 may be electrically coupled to each other, so that the third control signal terminal and the fourth control signal terminal serve as the same control signal terminal to receive the same control signal, such as receiving the third control signal. As shown in FIG. 5, the third control signal terminal and the fourth control signal terminal are both represented by G3, indicating that the third control signal terminal and the fourth control signal terminal may be implemented as the same control signal terminal to receive the same control signal.

Figure 6:
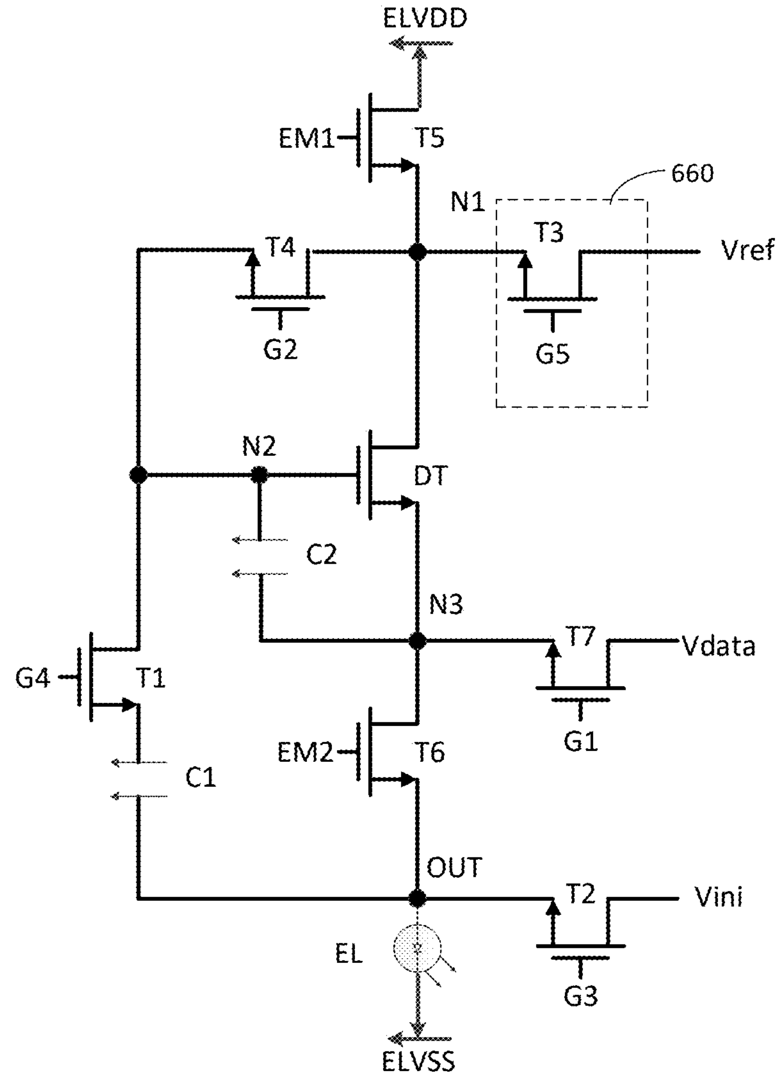
FIG. 6 shows a circuit diagram of a pixel circuit according to another embodiment of the present disclosure.

FIG. 6 shows a circuit diagram of a pixel circuit according to another embodiment of the present disclosure. The pixel circuit 600 shown in FIG. 6 is similar to the pixel circuit 200 shown in FIG. 2, except that at least the pixel circuit 600 further includes a third compensation circuit. For ease of description, detailed description will be made mainly on the differences in the following.

As shown in FIG. 6, the pixel circuit 600 may include a third compensation circuit 660 in addition to the driving circuit, writing circuit, light-emitting control circuit, first compensation circuit, and second compensation circuit as described above. The third compensation circuit 660 is coupled to a second voltage terminal Vref of the pixel circuit, a fifth control signal terminal G5 of the pixel circuit, and the first terminal N1 of the driving circuit. The third compensation circuit is used to provide a voltage of the second voltage terminal Vref to the first terminal N1 of the driving circuit under control of the fifth control signal terminal G5. For example, the third compensation circuit 660 may include a third transistor T3. A gate of the third transistor T3 is coupled to the fifth control signal terminal G5, a first electrode of the third transistor T3 is coupled to the second voltage terminal Vref, and a second electrode of the third transistor T3 is coupled to the first terminal N1 of the driving circuit.

The transistors described in above embodiments may be N-type transistors. If a transistor is an N-type transistor, a valid control level of the transistor is a high level, that is, the transistor is turned on when the control terminal of the transistor is at high level (e.g., 5V, 10V or other suitable voltage); and the transistor is turned off when the control terminal of the transistor is at low level (e.g., 0V, −5V, −10V or other suitable voltage). However, embodiments of the present disclosure are not limited to this. The transistors in above embodiments may also be P-type transistors. If a transistor is a P-type transistor, a valid control level of the transistor is a low level, that is, the transistor is turned on when the control terminal of the transistor is at low level (e.g., 0V, −5V, −10V or other suitable voltage); and the transistor is turned off when the control terminal of the transistor is at high level (e.g., 5V, 10V or other suitable voltage). If the type of transistor changes, adjusting the connection relationship or control signal in the circuit accordingly may achieve the same function.

Embodiments of the present disclosure further provide a pixel unit including a pixel circuit and a light-emitting unit. The pixel circuit may be implemented by any of the pixel circuits in above embodiments. The light-emitting unit may be coupled to the output terminal of the pixel circuit. For example, referring to FIGS. 2 to 6, a first electrode (e.g., anode) of the light-emitting unit EL may be coupled to the output signal terminal OUT of the pixel circuit, and a second electrode (e.g., cathode) of the light-emitting unit EL may be coupled to a reference signal terminal ELVSS. The light-emitting unit EL may be an organic light-emitting diode (OLED). The light-emitting unit EL may emit light under the driving current provided by the pixel circuit.

Figure 7:
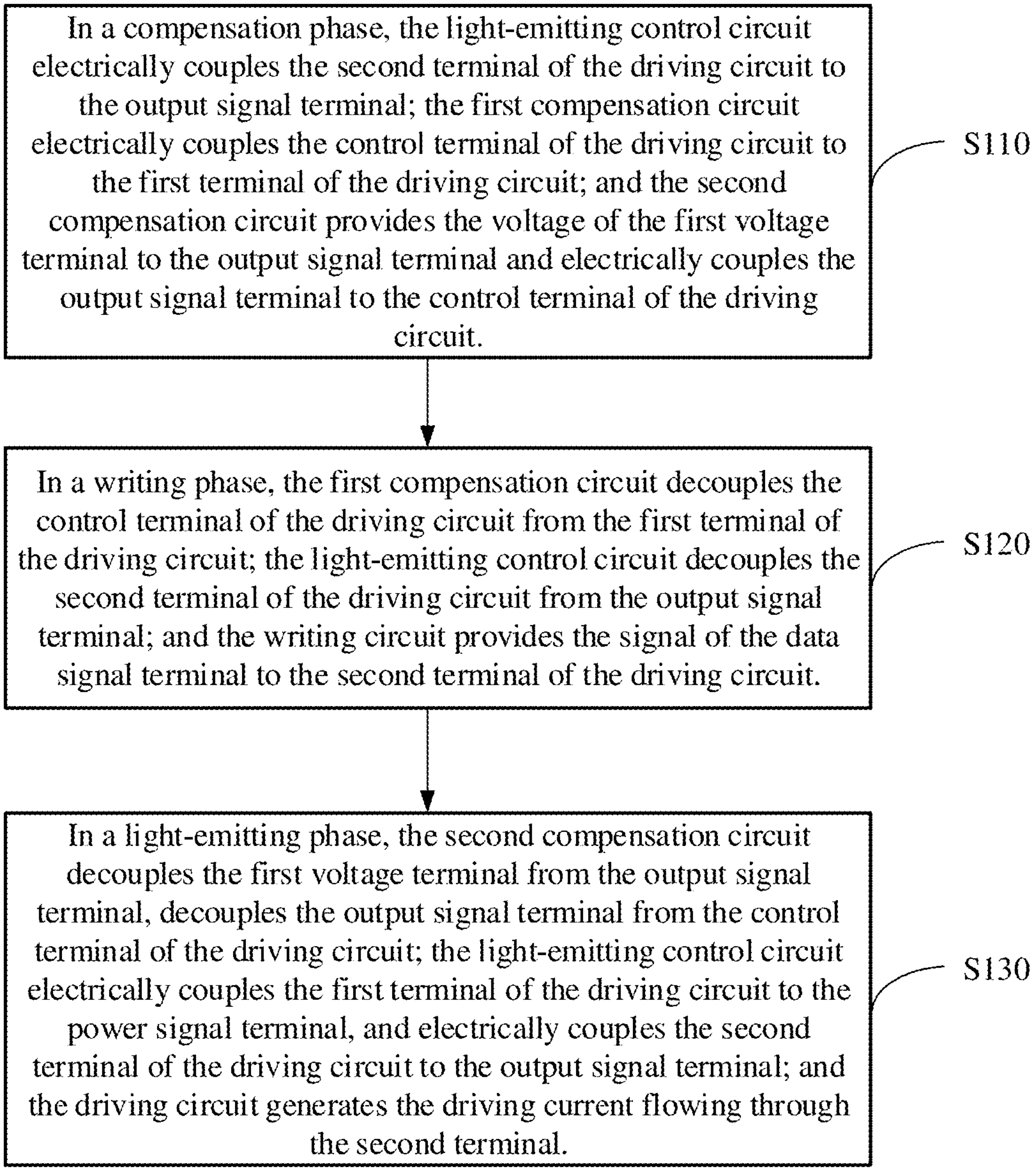
FIG. 7 shows a flowchart of a method for driving a pixel circuit according to an embodiment of the present disclosure.

FIG. 7 shows a flowchart of a method for driving a pixel circuit according to an embodiment of the present disclosure.

In operation S110, in a compensation phase, the light-emitting control circuit electrically couples the second terminal of the driving circuit to the output signal terminal; the first compensation circuit electrically couples the control terminal of the driving circuit to the first terminal of the driving circuit; and the second compensation circuit provides the voltage of the first voltage terminal to the output signal terminal and electrically couples the output signal terminal to the control terminal of the driving circuit.

In operation S120, in a writing phase, the first compensation circuit decouples the control terminal of the driving circuit from the first terminal of the driving circuit; the light-emitting control circuit decouples the second terminal of the driving circuit from the output signal terminal; and the writing circuit provides the signal of the data signal terminal to the second terminal of the driving circuit.

In operation S130, in a light-emitting phase, the second compensation circuit decouples the first voltage terminal from the output signal terminal and decouples the output signal terminal from the control terminal of the driving circuit; the light-emitting control circuit electrically couples the first terminal of the driving circuit to the power signal terminal and electrically couples the second terminal of the driving circuit to the output signal terminal, and the driving circuit generates the driving current flowing through the second terminal.

In some embodiments, the method further includes a reset phase before the compensation phase. In the reset phase, the light-emitting control circuit electrically couples the second terminal of the driving circuit to the output signal terminal; the first compensation circuit electrically couples the control terminal of the driving circuit to the first terminal of the driving circuit; and the second compensation circuit provides the voltage of the first voltage terminal to the output signal terminal and electrically couples the output signal terminal to the control terminal of the driving circuit.

In some embodiments, the method may further include: in the reset phase, electrically coupling, by the light-emitting control circuit, the power signal terminal to the first terminal of the driving circuit.

In some embodiments, in a case that the pixel circuit further includes a third compensation circuit, the method may further include: in the reset phase, decoupling, by the light-emitting control circuit, the power signal terminal from the first terminal of the driving circuit; and providing, by the third compensation circuit, the voltage of the second voltage terminal to the first terminal of the driving circuit.

In some embodiments, the third control signal terminal and the fourth control signal terminal are separated from each other so as to receive the third control signal and the fourth control signal, respectively. In this case, in the light-emitting phase, the second compensation circuit may decouple the first voltage terminal from the output signal terminal according to the third control signal, and decouple the output signal terminal from the control terminal of the driving circuit according to the fourth control signal. For example, under control of the third and fourth control signals, the second compensation circuit may decouple the output signal terminal from the control terminal of the driving circuit before decoupling the first voltage terminal from the output signal terminal.

In some embodiments, the third control signal terminal and the fourth control signal terminal are coupled to each other so as to receive the third control signal. In this case, in the light-emitting phase, the second compensation circuit may decouple the first voltage terminal from the output signal terminal according to the third control signal, and decouple the output signal terminal from the control terminal of the driving circuit according to the third control signal. For example, under control of the third control signal, the second compensation circuit may decouple the first voltage terminal from the output signal terminal and decouple the output signal terminal from the control terminal of the driving circuit.

Figure 8:
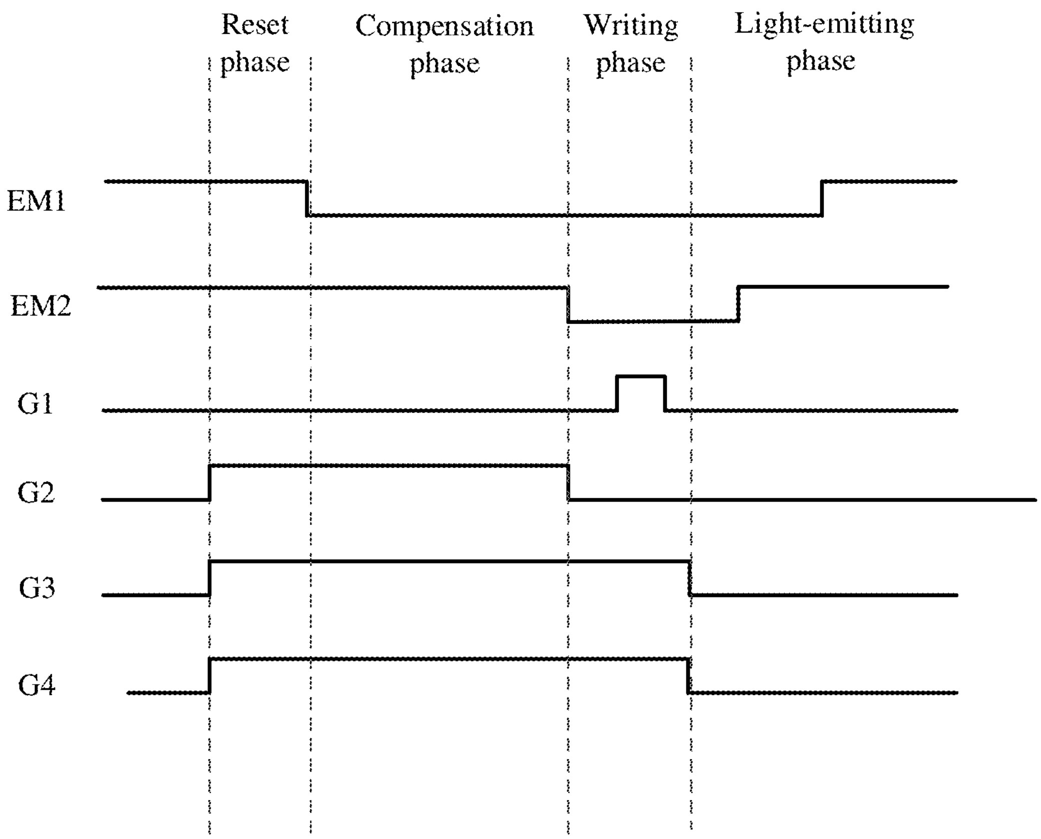
FIG. 8 shows a signal timing diagram of a pixel circuit according to an embodiment of the present disclosure.

FIG. 8 shows a signal timing diagram of a pixel circuit according to an embodiment of the present disclosure. This timing diagram is applicable to the pixel circuits of the above embodiments, such as the pixel circuit described above with reference to FIG. 2. The process of operating the pixel circuit 200 is described below in conjunction with FIG. 2 and FIG. 8.

In the reset phase, the signal of the first light-emitting signal terminal EM1 and the signal of the second light-emitting signal terminal EM2 are at high level; the signal of the second control signal terminal G2, the signal of the third control signal terminal G3, and the signal of the fourth control signal terminal G4 are at high level; and the signal of the first control signal terminal G1 is at low level. The low level of the first control signal terminal G1 causes the seventh transistor T7 to be turned off, thereby preventing data from being provided to the node N3. The high level of the first light-emitting signal terminal EM1 causes the fifth transistor T5 to be turned on, thereby providing the signal of the power signal terminal ELVDD to the node N1 (i.e., the first electrode N1 of the driving transistor DT). The signal of the power signal terminal ELVDD may be at a constant high level, such as 5V, 10V, or other suitable voltage. The high level of the second control signal terminal G2 causes the fourth transistor T4 to be turned on, so that the node N2 (i.e., the gate N2 of the driving transistor DT) is set to the voltage of the power signal terminal ELVDD. The high level of the third control signal terminal G3 causes the second transistor T2 to be turned on, thereby providing the voltage of the first voltage terminal Vini to the output signal terminal OUT. The voltage of the first voltage terminal Vini is lower than the voltage of the power signal terminal ELVDD, thereby causing the light-emitting unit EL to be in a non-emitting state when the voltage of the first voltage terminal Vini is applied to the light-emitting unit EL. The high level of the fourth control signal terminal G4 causes the first transistor T1 to be turned on, so that the output signal terminal OUT is coupled to the node N2 through the first capacitor C1. The high level of the second light-emitting signal terminal EM2 causes the sixth transistor T6 to be turned on, thereby providing the voltage of the output signal terminal OUT to the node N3 (i.e., the second electrode N3 of the driving transistor DT). Through the above process, the voltage of the node N1 and the voltage of the node N2 are caused to be the voltage of the power signal terminal ELVDD, and the voltage of the node N3 and the voltage of the output signal terminal OUT are caused to be the voltage of the first voltage terminal Vini.

In the compensation phase, the first light-emitting signal EM1 is switched to low level, so that the fifth transistor T5 is turned off. As the second light-emitting signal EM2 and the third control signal G3 remain at high level, the sixth transistor T6 and the second transistor T2 remain in a turned-on state, and the potential of the node N3 and the potential of the output signal terminal OUT remain at Vim, where VIN, represents the voltage of the first voltage terminal Vini. When the fifth transistor T5 is turned off, the potential of the node N1 and the potential of the node N2 are $V_{ELVDD}$, the potential of the node N3 is $V_{INI}$, and $V_{ELVDD}>V_{INI}$, where $V_{ELVDD}$ represents the voltage of the power signal terminal ELVDD. Accordingly, the node N1 and the node N2 is discharged towards the node N3 until the potential of the node N2 reaches $V_{INI}+V_{TH}$, where $V_{TH}$ represents the threshold voltage of the driving transistor DT.

In the writing phase, the second control signal terminal G2 and the second light-emitting signal terminal EM2 are switched to low level, and the first control signal terminal G1 is switched to high level. The high level of the first control signal terminal G1 causes the seventh transistor T7 to be turned on, thereby providing the voltage of the data signal terminal Vdata to the node N3. The low level of the second control signal terminal G2 causes the fourth transistor T4 to be turned off, and the low level of the second light-emitting signal terminal EM2 causes the sixth transistor T6 to be turned off, and the potential of the node N2 becomes $V_{INI}+V_{TH}+(V_{DATA}-V_{INI})*C_1/(C_1+C_2)$ due to the voltage division effect of the first capacitor C1 and the second capacitor C2, where $V_{DATA}$ represents the voltage of the data signal terminal Vdata, $C_1$ represents the capacitance value of the first capacitor C1, and $C_2$ represents the capacitance value of the second capacitor C2. In some embodiments, in the writing phase, the high-level duration of the signal of the first control signal terminal G1 may be within the low-level duration of the signal of the second light-emitting signal terminal EM2, so that the entire process of providing data voltage to the node N3 through the seventh transistor T7 is performed with the sixth transistor T6 turned off.

In the light-emitting phase, the first light-emitting signal terminal EM1 and the second light-emitting signal terminal EM2 are switched to high level, and the first control signal terminal G1, the second control signal terminal G2, the third control signal terminal G3, and the fourth control signal terminal G4 are at low level, so that the seventh transistor T7, the fourth transistor T4, the second transistor T2, and the first transistor T1 are turned off, and the fifth transistor T5 and the sixth transistor T6 are turned on. The voltage of the power signal terminal ELVDD is provided to the first electrode N1 of the driving transistor DT. The driving transistor DT generates a driving current under the voltage of the first electrode N1, the voltage of the gate N2, and the voltage of the second electrode N3. The generated driving current is provided to the light-emitting unit EL through the output signal terminal OUT, thereby driving the light-emitting unit EL to emit light.

The driving current generated by the driving transistor DT is:

$$I = K*(Vgs - Vth)^2, \quad \text{Equation (1)}$$

where K represents a resistivity of the driving transistor DT, and Vgs represents the gate-source voltage of the driving transistor DT, that is, the difference between the voltage of the gate and the voltage of the source.

As described above, at the beginning of the light-emitting phase, the voltage of the gate N1 of the driving transistor DT is $V_{INI}+V_{TH}+(V_{DATA}-V_{INI})*C_1/(C_1+C_2)$, the voltage of the source (in this embodiment, the second electrode N3) of the driving transistor DT is $V_{DATA}$, and the threshold voltage of the driving transistor DT is $V_{TH}$. Therefore, the gate-source voltage $Vgs=V_{INI}+V_{TH}+(V_{DATA}-V_{INI})*C_1/(C_1+C_2)-V_{DATA}-V_{TH}$, which is substituted into the above equation (1) to obtain:

$$I = K*\left(V_{INI} + V_{TH} + (V_{DATA} - V_{INI})*C_1/(C_1 + C_2) - V_{DATA} - V_{TH}\right)^2 = K*(V_{INI} - V_{DATA})*C_2/(C_1 + C_2)). \quad \text{Equation (2)}$$

According to the above equation (2), it may be seen that the driving current I flowing through the light-emitting unit EL is no longer related to the threshold voltage $V_{TH}$ of the driving transistor DT, thereby eliminating the influence of the threshold voltage $V_{TH}$ on the driving current and achieving compensation for the pixel circuit. In this way, even if the threshold voltage $V_{TH}$ of the driving transistor DT drifts due to the manufacturing process and long-term operation of the driving transistor DT, the threshold voltage drift will not affect the driving current, thus improving the display effect of the pixel unit including the pixel circuit.

In the above process, the provision of the first transistor T1 may further stabilize the output of the driving transistor DT. For example, with reference to FIG. 2, if the first transistor T1 is not provided, the output signal terminal OUT will always be coupled to the first capacitor C1. Therefore, the following situation will occur: in the light-emitting phase, at a time instant when the sixth transistor T6 is turned on, the voltage of the node N3 is $V_{DATA}$, the voltage of the output signal terminal OUT is $V_{INI}$, and a difference exists between the voltage of the node N3 and the voltage of the output signal terminal OUT, so that the potential of the output signal terminal OUT is instantly pulled up by the node N3. At this point, as the output signal terminal OUT is coupled to the first capacitor C1, the voltage of the output signal terminal OUT will affect the voltage of the node N3 through the coupling effect of the first capacitor C1 and the second capacitor C2, thereby causing the voltage of the node N3 to deviate from the expected value and affecting the output of the driving transistor DT. In embodiments of the present disclosure, by providing the first transistor T1 controlled by the fourth control signal terminal G4, the first transistor T1 may be turned off by using the signal of the fourth control signal terminal G4 in the light-emitting phase, thereby preventing the voltage of the node N3 from being affected by the voltage of the output signal terminal OUT. This is beneficial for the stability of the driving signal output by the driving transistor DT.

As shown in FIG. 8, the signal (hereinafter referred to as the third control signal) of the third control signal terminal G3 is identical to the signal (hereinafter referred to as the fourth control signal) of the fourth control signal terminal G4. However, embodiments of the present disclosure are not limited to this. The third control signal may be different from the fourth control signal. For example, in the writing phase, the fourth control signal of the fourth control signal terminal G4 may be switched to low level before the third control signal of the third control signal terminal G3 is switched to low level, so that the first transistor T1 is turned off before the second transistor T2 is turned off, with reference to FIG. 2. In this way, the output signal terminal OUT is decoupled from the node N2 before the first voltage terminal Vini is decoupled from the output signal terminal OUT, thereby further stabilizing the voltage of the node N2.

In some embodiments, in the light-emitting phase, the second control signal of the second control signal terminal EM2 and the first control signal of the first control signal terminal EM1 may be simultaneously switched from low level to high level, so that both the fifth transistor T5 and the sixth transistor T6 are turned on simultaneously, causing the driving transistor DT to generate a driving current. However, embodiments of the present disclosure are not limited to this. In other embodiments, as shown in FIG. 8, the second control signal terminal EM2 may be switched to high level before the first control signal terminal EM1 is switched to high level, which causes the sixth transistor T6 to be turned on before the fifth transistor T5 is turned on, so that the node N3 is coupled to the output signal terminal OUT before the driving transistor DT generates the driving current, thereby avoiding the flicker of the light-emitting unit EL caused by turning on the fifth transistor T5 and the sixth transistor T6 at the same time.

In some embodiments, in the light-emitting phase, the signal of the first light-emitting signal terminal EM1 and the signal of the second light-emitting signal terminal EM2 may be switched high level after the third control signal terminal G3 and the fourth control signal terminal G4 are switched to low level for a time period. This ensures that the first transistor T1 and the second transistor T2 are turned off before turning on the fifth transistor T5 and the sixth transistor T6, thereby further stabilizing the output of the driving transistor DT.

The timing diagram shown in FIG. 8 is also applicable to the pixel circuit 300 shown in FIG. 3. The process of operating the pixel circuit 300 is the same as the process described above, and will not be repeated here. Compared to the pixel circuit 200 shown in FIG. 2, the position of the first transistor T1 and the position of the first capacitor C1 in the pixel circuit 300 are interchanged so as to further stabilize the voltage of the node N2. For example, with reference to FIG. 3 and FIG. 8, if the first transistor T1 and the first capacitor C1 are coupled as shown in FIG. 2, then in the light-emitting phase, the first transistor T1 is turned off, and the first capacitor C1 remains coupled to the node N2, which causes the node N2 to be coupled to a floating first capacitor C1 in the light-emitting phase, and the presence of the floating capacitor will affect the voltage of the node N2. In the pixel circuit 300 shown in FIG. 3, the first capacitor C1 is coupled to the output signal terminal OUT, and the first transistor T1 is coupled to the node N2, so that when the first transistor T1 is turned off in the light-emitting phase, the first capacitor C1 is decoupled from the node N2, thereby avoiding the influence of the floating capacitor on the node N2 and further improving the stability of the output of the driving transistor DT.

The timing diagram shown in FIG. 8 is also applicable to the pixel circuit 400 shown in FIG. 4. The process of operating the pixel circuit 400 is similar to the process described above. The following will describe the process of operating the pixel circuit 400 with reference to FIGS. 4 and 8. For the sake of simplicity, detailed description will be made mainly on the differences in the following.

In the reset phase, the signal of the first light-emitting signal terminal EM1 and the signal of the second light-emitting signal terminal EM2 are at high level; the signal of the second control signal terminal G2, the signal of the third control signal terminal G3, and the signal of the fourth control signal terminal G4 are at high level; and the signal of the first control signal terminal G1 is at low level. The low level of the first control signal terminal G1 causes the seventh transistor T7 to be turned off, so that data is not written to the node N3. The high level of the first light-emitting signal terminal EM1 causes the fifth transistor T5 to be turned on, so that the signal of the power signal terminal ELVDD is provided to the node N1 (i.e., the first electrode N1 of the driving transistor DT). The signal of the power signal terminal ELVDD may be at a constant high level, such as 5V, 10V, and other suitable voltage. The high level of the second control signal terminal G2 causes the fourth transistor T4 to be turned on, so that the node N2 (i.e., the gate N2 of the driving transistor DT) is set to the voltage of the power signal terminal ELVDD. The high level of the third control signal terminal G3 causes the second transistor T2 to be turned on, and the high level of the fourth control signal terminal G4 causes the first transistor T1 to be turned on, so that the voltage of the first voltage terminal Vini is provided to the output signal terminal OUT. The voltage of the first voltage terminal Vini is lower than the voltage of the power signal terminal ELVDD, so that the light-emitting unit EL is in a non-emitting state when the voltage of the first voltage terminal Vini is applied to the light-emitting unit EL. As the first transistor T1 is turned on, the output signal terminal OUT is coupled to the node N2 through the first capacitor C1. The high level of the second light-emitting signal terminal EM2 causes the sixth transistor T6 to be turned on, thereby providing the voltage of the output signal terminal OUT to the node N3 (i.e., the second electrode N3 of the driving transistor DT). Through the above process, the nodes N1 and N2 are set to the voltage of the power signal terminal ELVDD, and the node N3 and the output signal terminal OUT are set to the voltage of the first voltage terminal Vini.

In the compensation phase, the first light-emitting signal EM1 is switched to low level, so that the fifth transistor T5 is turned off. As the second light-emitting signal EM2, the third control signal G3 and the fourth control signal terminal G4 remain at high level, the sixth transistor T6, the second transistor T2, and the first transistor T1 remain in a turned-on state, and the potential of the node N3 and the potential of the output signal terminal OUT remain at $V_{INI}$, where $V_{INI}$ represents the voltage of the first voltage terminal Vini. When the fifth transistor T5 is turned off, the potential of the node N1 and the potential of the node N2 are $V_{ELVDD}$, the potential of the node N3 is $V^{INI}$, and $V_{ELVDD}>V_{INI}$, where $V_{ELVDD}$ represents the voltage of the power signal terminal ELVDD. Accordingly, the node N1 and the node N2 is discharged towards the node N3 until the potential of the node N2 reaches $V_{INI}+V_{TH}$, where $V_{TH}$ represents the threshold voltage of the driving transistor DT.

In the writing phase, the second control signal terminal G2 and the second light-emitting signal terminal EM2 are switched to low level, and the first control signal terminal G1 is switched to high level. The high level of the first control signal terminal G1 causes the seventh transistor T7 to be turned on, thereby providing the voltage of the data signal terminal Vdata to the node N3. The low level of the second control signal terminal G2 causes the fourth transistor T4 to be turned off, and the low level of the second light-emitting signal terminal EM2 causes the sixth transistor T6 to be turned off, and the potential of the node N2 becomes $V_{INI}+V_{TH}+(V_{DATA}-V_{INI})*C_1/(C_1+C_2)$ due to the voltage division effect of the first capacitor C1 and the second capacitor C2, where $V_{DATA}$ represents the voltage of the data signal terminal Vdata, $C_1$ represents the capacitance value of the first capacitor C1, and $C_2$ represents the capacitance value of the second capacitor C2. In some embodiments, in the writing phase, the high-level duration of the signal of the first control signal terminal G1 may be within the low-level duration of the signal of the second light-emitting signal terminal EM2, so that the entire process of providing data voltage to the node N3 through the seventh transistor T7 is performed with the sixth transistor T6 turned off.

In the light-emitting phase, the first light-emitting signal terminal EM1 and the second light-emitting signal terminal EM2 are switched to high level, and the first control signal terminal G1, the second control signal terminal G2, the third control signal terminal G3, and the fourth control signal terminal G4 are at low level, so that the seventh transistor T7, the fourth transistor T4, the second transistor T2, and the first transistor T1 are turned off, and the fifth transistor T5 and the sixth transistor T6 are turned on. The voltage of the power signal terminal ELVDD is provided to the first electrode N1 of the driving transistor DT. The driving transistor DT generates a driving current under the voltage of the first electrode N1, the voltage of the gate N2, and the voltage of the second electrode N3. The generated driving current is provided to the light-emitting unit EL through the output signal terminal OUT, thereby driving the light-emitting unit EL to emit light. According to above equations (1) and (2), the driving current generated by the driving transistor DT is no longer related to the threshold voltage $V_{TH}$ of the driving transistor DT, thereby eliminating the influence of the threshold voltage $V_{TH}$ on the driving current and achieving compensation for the pixel circuit.

In the above process, the provision of the first transistor T1 may also further stabilize the output of the driving transistor DT. For example, with reference to FIG. 4, the first transistor T1 may be turned off by using the signal of the fourth control signal terminal G4 in the light-emitting phase, preventing the voltage of the node N3 from being affected by the voltage of the output signal terminal OUT. This is beneficial for the stability of the driving signal output by the driving transistor DT.

Figure 9:
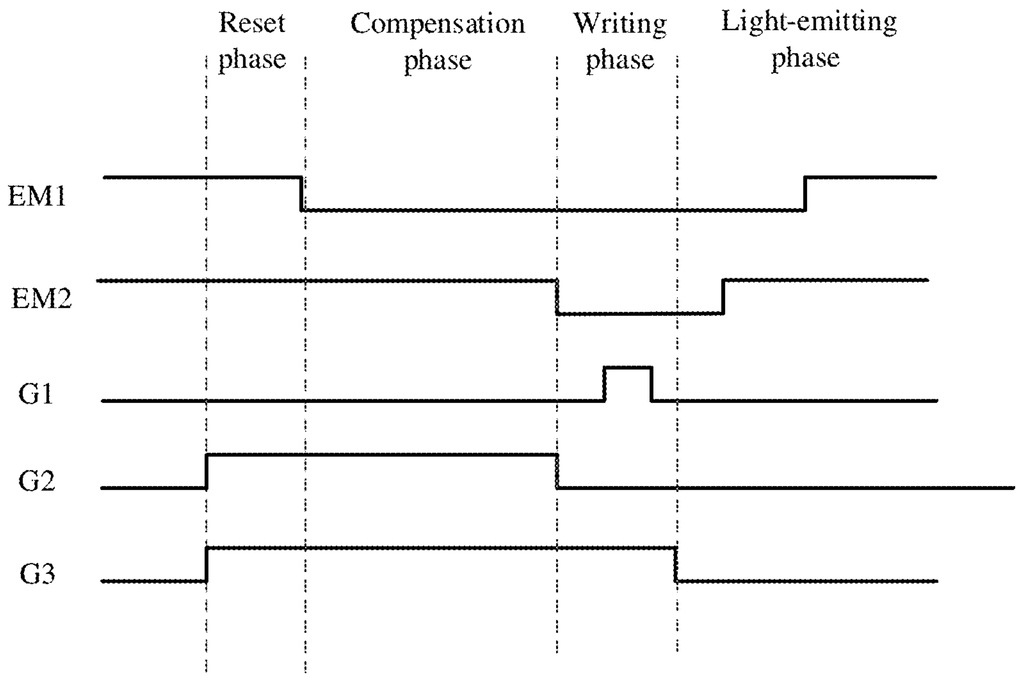
FIG. 9 shows a signal timing diagram of a pixel circuit according to another embodiment of the present disclosure.

FIG. 9 shows a signal timing diagram of a pixel circuit according to another embodiment of the present disclosure. The signal timing shown in FIG. 9 is applicable to the pixel circuits of the above embodiments, such as the pixel circuit shown in FIG. 5. The process of operating the pixel circuit 500 will be described below in conjunction with FIGS. 5 and 9. By comparing FIG. 9 and FIG. 8, it may be seen that the process of operating the pixel circuit 500 shown in FIG. 5 is similar to that of the pixel circuit 200 shown in FIG. 2, at least except that the third control signal terminal and the fourth control signal terminal are implemented as a single control signal terminal G3 (hereinafter referred to as the third control signal terminal G3 for ease of description). For the sake of simplicity, detailed description will be made mainly on the differences in the following.

In the reset phase, the signal of the first light emitting signal terminal EM1 and the signal of the second light emitting signal terminal EM2 are at high level; the second control signal terminal G2 and the third control signal terminal G3 are at high level; and the signal of the first control signal terminal G1 is at low level. The low level of the first control signal terminal G1 causes the seventh transistor T7 to be turned off, so that data is not written to the node N3. The high level of the first light-emitting signal terminal EM1 causes the fifth transistor T5 to be turned on, so that the signal of the power signal terminal ELVDD is provided to the node N1 (i.e., the first electrode N1 of the driving transistor DT). The signal of the power signal terminal ELVDD may be at a constant high level, such as 5V, 10V, and other suitable voltage. The high level of the second control signal terminal G2 causes the fourth transistor T4 to be turned on, so that the node N2 (i.e., the gate N2 of the driving transistor DT) is also set to the voltage of the power signal terminal ELVDD. The high level of the third control signal terminal G3 causes both the first transistor T1 and the second transistor T2 to be turned on, so that the voltage of the first voltage terminal Vini is provided to the output signal terminal OUT and the output signal terminal OUT is coupled to the node N2 through the first capacitor C1. The voltage of the first voltage terminal Vini is lower than the voltage of the power signal terminal ELVDD, so that the light-emitting unit EL is in a non-emitting state when the voltage of the first voltage terminal Vini is applied to the tight-emitting unit EL. The high level of the second light-emitting signal terminal EM2 causes the sixth transistor T6 to be turned on, so that the voltage of the output signal terminal OUT is provided to the node N3 (i.e., the second electrode N3 of the driving transistor DT). Through the above process, the nodes N1 and N2 are set to the voltage of the power signal terminal ELVDD, and the node N3 and the output signal terminal OUT are set to the voltage of the first voltage terminal Vini.

In the compensation phase, the first light-emitting signal EM1 is switched to low level, so that the fifth transistor T5 is turned off. As the second light-emitting signal EM2 and the third control signal G3 remain at high level, the sixth transistor T6, the first transistor T1, and the second transistor T2 remain in a turned-on state, and the potential of the node N3 and the potential of the output signal terminal OUT remain at $V_{INI}$, where $V_{INI}$ represents the voltage of the first voltage terminal Vini. When the fifth transistor T5 is turned off, the potential of the node N1 and the potential of the node N2 are $V_{ELVDD}$, the potential of the node N3 is $V_{INI}$, and $V_{ELVDD}>V_{INI}$, where $V_{ELVDD}$ represents the voltage of the power signal terminal ELVDD. Accordingly, the node N1 and the node N2 are discharged towards the node N3 until the potential of the node N2 reaches $V_{INI}+V_{TH}$, where $V_{TH}$ represents the threshold voltage of the driving transistor DT.

In the writing phase, the second control signal terminal G2 and the second light-emitting signal terminal EM2 are switched to low level, and the first control signal terminal G1 is switched to high level. The high level of the first control signal terminal G1 causes the seventh transistor T7 to be turned on, so that the voltage of the data signal terminal Vdata is provided to the node N3. The low level of the second control signal terminal G2 causes the fourth transistor T4 to be turned off, and the low level of the second light-emitting signal terminal EM2 causes the sixth transistor T6 to be turned off, and the potential of the node N2 becomes $V_{INI}+V_{TH}+(V_{DATA}-V_{INI})*C_1/(C_1+C_2)$ due to the voltage division effect of the first capacitor C1 and the second capacitor C2, where $V_{DATA}$ represents the voltage of the data signal terminal Vdata, $C_1$ represents the capacitance value of the first capacitor C1, and $C_2$ represents the capacitance value of the second capacitor C2. In some embodiments, in the writing phase, the high-level duration of the signal of the first control signal terminal G1 may be within the low-level duration of the signal of the second light-emitting signal terminal EM2, so that the entire process of providing data voltage to the node N3 through the seventh transistor T7 is performed with the sixth transistor T6 turned off.

In the light-emitting phase, the first light-emitting signal terminal EM1 and the second light-emitting signal terminal EM2 are switched to high level, and the first control signal terminal G1, the second control signal terminal G2, and the third control signal terminal G3 are at low level, so that the seventh transistor T7, the fourth transistor T4, the second transistor T2, and the first transistor T1 are turned off, and the fifth transistor T5 and the sixth transistor T6 are turned on. The voltage of the power signal terminal ELVDD is provided to the first electrode N1 of the driving transistor DT. The driving transistor DT generates a driving current based on the voltage of the first electrode N1, the voltage of the gate N2, and the voltage of the second electrode N3. The generated driving current is provided to the light-emitting unit EL through the output signal terminal OUT, thereby driving the light-emitting unit EL to emit light.

According to above equations (1) and (2), the driving current generated by the driving transistor DT is no longer related to the threshold voltage $V_{TH}$ of the driving transistor DT, thereby eliminating the influence of the threshold voltage $V_{TH}$ on the driving current and achieving compensation for the pixel circuit.

In the above process, the provision of the first transistor T1 may also further stabilize the output of the driving transistor DT. For example, with reference to FIG. 5, in the light-emitting phase, both the first transistor T1 and the second transistor T2 are turned off by using the signal (such as the third control signal) of the third control signal terminal G3 shared by the first transistor T1 and the second transistor T2, thereby preventing the voltage of the node N3 from being affected by the voltage of the output signal terminal OUT, which is beneficial for the stability of the driving signal output by the driving transistor DT.

Figure 10:
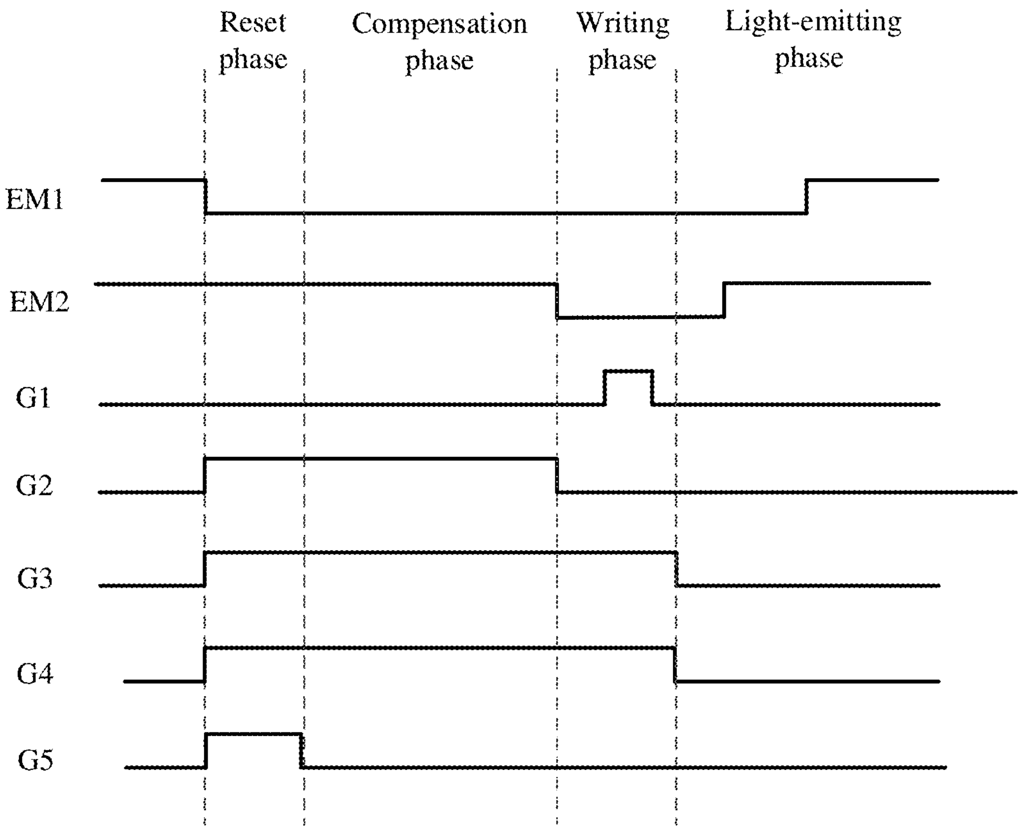
FIG. 10 shows a signal timing diagram of a pixel circuit according to another embodiment of the present disclosure.

FIG. 10 shows a signal timing diagram of a pixel circuit according to another embodiment of the present disclosure. The signal timing shown in FIG. 10 is applicable to the pixel circuits of the above embodiments, such as the pixel circuit shown in FIG. 6. The process of operating the pixel circuit 600 will be described below in conjunction with FIGS. 6 and 10. By comparing the signal timing shown in FIG. 10 and the signal timing shown in FIG. 8, it may be seen that the process of operating the pixel circuit 600 shown in FIG. 6 is similar to that of the pixel circuit 200 shown in FIG. 2, except at least for the operation in the reset phase. For the sake of simplicity, detailed description will be made mainly on the differences in the following.

In the reset phase, the first light-emitting signal terminal EM1 is at low level, the signal of the second light-emitting signal terminal EM2 is at high level; the signal of the second control signal terminal G2, the signal of the third control signal terminal G3, the signal of the fourth control signal terminal G4, and the signal of the fifth control signal terminal G5 are at high level; and the signal of the first control signal terminal G1 is at low level. The low level of the first control signal terminal G1 causes the seventh transistor T7 to be turned off, so that data is not written to the node N3. The low level of the first light-emitting signal terminal EM1 causes the fifth transistor T5 to be turned off, thereby decoupling the power signal terminal ELVDD from the node N1. The high level of the fifth control signal terminal G5 causes the third transistor T3 to be turned on, so that the voltage of the second voltage terminal Vref is provided to the node N1. The signal of the power signal terminal ELVDD may be at a constant high level, such as 5V, 10V, and other suitable voltage. The high level of the second control signal terminal G2 causes the fourth transistor T4 to be turned on, the high level of the third control signal terminal G3 causes the second transistor T2 to be turned on, and the high level of the fourth control signal terminal G4 causes the first transistor T1 to be turned on, thereby causing the node N2 to be at the voltage of the second voltage terminal Vref, providing the voltage of the first voltage terminal Vini to the output signal terminal OUT, and coupling the output signal terminal OUT to the node N2 through the first capacitor C1. The high level of the second light-emitting signal terminal EM2 causes the sixth transistor T6 to be turned on, so that the voltage of the output signal terminal OUT is provided to the node N3. Through the above process, the nodes N1 and N2 are set to the voltage of the second voltage terminal Vref, and the node N3 and the output signal terminal OUT are set to the voltage of the first voltage terminal Vini.

In the compensation phase, the fifth control signal terminal G5 is switched to low level, so that the third transistor T3 is turned off. The sixth transistor T6 and the second transistor T2 is kept in turned-on state and the potential of the node N3 and the potential of the output signal terminal OUT are kept at $V_{INI}$, because the second light-emitting signal EM2 and the third control signal G3 are kept at high level. When the third transistor T3 is turned off, the potential of the node N1 and the potential of the node N2 are $V_{REF}$, the potential of the node N3 is $V_{INI}$, and $V_{REF}>V_{INI}$, where $V_{REF}$ represents the voltage of the second voltage terminal Vref. Accordingly, the node N1 and the node N2 are discharged towards the node N3 until the potential of the node N2 reaches $V_{INI}+V_{TH}$, where $V_{TH}$ represents the threshold voltage of the driving transistor DT.

In the writing phase, the second control signal terminal G2 and the second light-emitting signal terminal EM2 are switched to low level, and the first control signal terminal G1 is switched to high level. The high level of the first control signal terminal G1 causes the seventh transistor T7 to be turned on, thereby providing the voltage of the data signal terminal Vdata to the node N3. The low level of the second control signal terminal G2 causes the fourth transistor T4 to be turned off, and the low level of the second light-emitting signal terminal EM2 causes the sixth transistor T6 to be turned off, and the potential of the node N2 becomes $V_{INI}+V_{TH}+(V_{DATA}-V_{INI})*C_1/(C_1+C_2)$ due to the voltage division effect of the first capacitor $C_1$ and the second capacitor C2, where $V_{DATA}$ represents the voltage of the data signal terminal Vdata, $C_1$ represents the capacitance value of the first capacitor C1, and $C_2$ represents the capacitance value of the second capacitor C2. In some embodiments, in the writing phase, the high-level duration of the signal of the first control signal terminal G1 may be within the low-level duration of the signal of the second light-emitting signal terminal EM2, so that the entire process of providing data voltage to the node N3 through the seventh transistor T7 is performed with the sixth transistor T6 turned off.

In the light-emitting phase, the first light-emitting signal terminal EM1 and the second light-emitting signal terminal EM2 are switched to high level, and the first control signal terminal G1, the second control signal terminal G2, the third control signal terminal G3, the fourth control signal terminal G4, and the fifth control signal terminal G5 are at low level, so that the seventh transistor T7, the fourth transistor T4, the second transistor T2, the first transistor T1, and the third transistor T3 are turned off, and the fifth transistor T5 and the sixth transistor T6 are turned on. The voltage of the power signal terminal ELVDD is provided to the first electrode N1 of the driving transistor DT. The driving transistor DT generates a driving current under the voltage of the first electrode N1, the voltage of the gate N2, and the voltage of the second electrode N3. The generated driving current is provided to the light-emitting unit EL through the output signal terminal OUT, thereby driving the light-emitting unit EL to emit light.

According to the above equations (1) and (2), the driving current generated by the driving transistor DT is no longer related to the threshold voltage $V_{TH}$ of the driving transistor DT, thereby eliminating the influence of the threshold voltage $V_{TH}$ on the driving current and achieving compensation for the pixel circuit. In the above process, the provision of the first transistor T1 may also further stabilize the output of the driving transistor DT, which will not be repeated here.

In this embodiment, by providing the third compensation circuit 660, the reset of the nodes N1 and N2 is not restricted by the voltage of the power signal terminal ELVDD. The voltage of the second voltage terminal Vref may be set as desired, so as to reset the nodes N1 and N2 to a desired level.

Those skilled in the art may understand that embodiments described above are exemplary, and those skilled in the art may improve them. The structures described in various embodiments may be freely combined without structural or principle conflicts.

After elaborating on the preferred embodiments of the present disclosure, those skilled in the art may clearly understand that various changes and approaches may be made without departing from the scope and spirit of the accompanying claims, and the present disclosure is not limited to the implementation methods of the exemplary embodiments cited in the specification.

What is claimed is:

1. A pixel circuit, comprising:

a driving circuit comprising a control terminal, a first terminal, and a second terminal, and configured to generate a driving current flowing through the second terminal of the driving circuit;

a writing circuit coupled to a data signal terminal of the pixel circuit, a first control signal terminal of the pixel circuit, and the second terminal of the driving circuit, and configured to provide a signal of the data signal terminal to the second terminal of the driving circuit under control of the first control signal terminal;

a light-emitting control circuit coupled to a first light-emitting signal terminal of the pixel circuit, a second light-emitting signal terminal of the pixel circuit, a power signal terminal of the pixel circuit, an output signal terminal of the pixel circuit, the first terminal of the driving circuit, and the second terminal of the driving circuit, and configured to electrically couple the first terminal of the driving circuit to the power signal terminal under control of the first light-emitting signal terminal, and to electrically couple the second terminal of the driving circuit to the output signal terminal under control of the second light-emitting signal terminal;

a first compensation circuit coupled between the control terminal of the driving circuit and the first terminal of the driving circuit and coupled to a second control signal terminal of the pixel circuit, and configured to electrically couple the control terminal of the driving circuit to the first terminal of the driving circuit or electrically decouple the control terminal of the driving circuit from the first terminal of the driving circuit, according to a signal of the second control signal terminal; and a second compensation circuit coupled between the control terminal of the driving circuit and the output signal terminal and coupled to a first voltage terminal of the pixel circuit, a third control signal terminal of the pixel circuit, and a fourth control signal terminal of the pixel circuit, and configured to provide a voltage of the first voltage terminal to the output signal terminal under control of the third control signal terminal, and to electrically couple the output signal terminal to the control terminal of the driving circuit or electrically decouple the output signal terminal from the control terminal of the driving circuit, according to a signal of the fourth control signal terminal.

2. The pixel circuit according to claim 1, wherein the second compensation circuit comprises:

a first sub-circuit coupled to the first voltage terminal, the output signal terminal, and the third control signal terminal, and configured to provide the voltage of the first voltage terminal to the output signal terminal under control of the third control signal terminal; and a second sub-circuit coupled between the control terminal of the driving circuit and the output signal terminal and coupled to the fourth control signal terminal, and configured to electrically couple the output signal terminal to the control terminal of the driving circuit or electrically decouple the output signal terminal from the control terminal of the driving circuit, according to the signal of the fourth control signal terminal.

3. The pixel circuit according to claim 2, wherein the second sub-circuit comprises a first transistor and a first capacitor, the first transistor and the first capacitor are coupled in series between the control terminal of the driving circuit and the output signal terminal, and a gate of the first transistor is coupled to the fourth control signal terminal.

4. The pixel circuit according to claim 3, wherein a first electrode of the first transistor is coupled to the control terminal of the driving circuit, a second electrode of the first transistor is coupled to a first electrode of the first capacitor, and a second electrode of the first capacitor is coupled to the output signal terminal.

5. The pixel circuit according to claim 3, wherein a first electrode of the first capacitor is coupled to the control terminal of the driving circuit, a second electrode of the first capacitor is coupled to a first electrode of the first transistor, and a second electrode of the first transistor is coupled to the output signal terminal.

6. The pixel circuit according to claim 2, wherein the first sub-circuit comprises a second transistor, a gate of the second transistor is coupled to the third control signal terminal, a first electrode of the second transistor is coupled to the first voltage terminal, and a second electrode of the second transistor is coupled to the output signal terminal.

7. The pixel circuit according to claim 6, wherein the second electrode of the second transistor is coupled to the output signal terminal through the first transistor; and wherein the second electrode of the second transistor is coupled to a first electrode of the first transistor, a second electrode of the first transistor is coupled to the output signal terminal, a first electrode of the first capacitor is coupled to the control terminal of the driving circuit, and a second electrode of the first capacitor is coupled to the first electrode of the first transistor.

8. The pixel circuit according to claim 1, further comprising a third compensation circuit coupled to a second voltage terminal of the pixel circuit, a fifth control signal terminal of the pixel circuit, and the first terminal of the driving circuit, and configured to provide a voltage of the second voltage terminal to the first terminal of the driving circuit under control of the fifth control signal terminal.

9. The pixel circuit according to claim 8, wherein the third compensation circuit comprises a third transistor, a gate of the third transistor is coupled to the fifth control signal terminal, a first electrode of the third transistor is coupled to the second voltage terminal, and a second electrode of the third transistor is coupled to the first terminal of the driving circuit.

10. The pixel circuit according to claim 1, wherein the third control signal terminal and the fourth control signal terminal are separated from each other so as to receive a third control signal and a fourth control signal, respectively; or wherein the third control signal terminal and the fourth control signal terminal are coupled to each other so as to receive a third control signal.

11. The pixel circuit according to claim 1, wherein the first compensation circuit comprises a fourth transistor, a gate of the fourth transistor is coupled to the second control signal terminal, a first electrode of the fourth transistor is coupled to the first terminal of the driving circuit, and a second electrode of the fourth transistor is coupled to the control terminal of the driving circuit.

12. The pixel circuit according to claim 1, wherein the light-emitting control circuit comprises a fifth transistor and a sixth transistor;

a gate of the fifth transistor is coupled to the first light-emitting signal terminal, a first electrode of the fifth transistor is coupled to the power signal terminal, and a second electrode of the fifth transistor is coupled to the first terminal of the driving circuit; and a gate of the sixth transistor is coupled to the second light-emitting signal terminal, a first electrode of the sixth transistor is coupled to the second terminal of the driving circuit, and a second electrode of the sixth transistor is coupled to the output signal terminal.

13. The pixel circuit according to claim 1, wherein the writing circuit comprises a seventh transistor, a gate of the seventh transistor is coupled to the first control signal terminal, a first electrode of the seventh transistor is coupled to the data signal terminal, and a second electrode of the seventh transistor is coupled to the second terminal of the driving circuit.

14. The pixel circuit according to claim 1, wherein the driving circuit comprises a driving transistor and a second capacitor, a gate of the driving transistor serves as the control terminal of the driving circuit, a first electrode of the driving transistor serves as the first terminal of the driving circuit, and a second electrode of the driving transistor serves as the second terminal of the driving circuit; and a first electrode of the second capacitor is coupled to the gate of the driving transistor, and a second electrode of the second capacitor is coupled to the second electrode of the driving transistor.

15. A pixel unit, comprising:

the pixel circuit according to claim 1; and a light-emitting unit.

16. A method for driving the pixel circuit, the pixel circuit comprising: a driving circuit comprising a control terminal, a first terminal, and a second terminal, and configured to generate a driving current flowing through the second terminal of the driving circuit; a writing circuit coupled to a data signal terminal of the pixel circuit, a first control signal terminal of the pixel circuit, and the second terminal of the driving circuit, and configured to provide a signal of the data signal terminal to the second terminal of the driving circuit under control of the first control signal terminal; a light-emitting control circuit coupled to a first light-emitting signal terminal of the pixel circuit, a second light-emitting signal terminal of the pixel circuit, a power signal terminal of the pixel circuit, an output signal terminal of the pixel circuit, the first terminal of the driving circuit, and the second terminal of the driving circuit, and configured to electrically couple the first terminal of the driving circuit to the power signal terminal under control of the first light-emitting signal terminal, and to electrically couple the second terminal of the driving circuit to the output signal terminal under control of the second light-emitting signal terminal; a first compensation circuit coupled between the control terminal of the driving circuit and the first terminal of the driving circuit and coupled to a second control signal terminal of the pixel circuit, and configured to electrically couple the control terminal of the driving circuit to the first terminal of the driving circuit or electrically decouple the control terminal of the driving circuit from the first terminal of the driving circuit, according to a signal of the second control signal terminal; and a second compensation circuit coupled between the control terminal of the driving circuit and the output signal terminal and coupled to a first voltage terminal of the pixel circuit, a third control signal terminal of the pixel circuit, and a fourth control signal terminal of the pixel circuit, and configured to provide a voltage of the first voltage terminal to the output signal terminal under control of the third control signal terminal, and to electrically couple the output signal terminal to the control terminal of the driving circuit or electrically decouple the output signal terminal from the control terminal of the driving circuit, according to a signal of the fourth control signal terminal, the method comprising:

in a compensation phase, electrically coupling the second terminal of the driving circuit to the output signal terminal by the light-emitting control circuit, electrically coupling the control terminal of the driving circuit to the first terminal of the driving circuit by the first compensation circuit, and providing the voltage of the first voltage terminal to the output signal terminal and electrically coupling the output signal terminal to the control terminal of the driving circuit by the second compensation circuit;

in a writing phase, decoupling the control terminal of the driving circuit from the first terminal of the driving circuit by the first compensation circuit, decoupling the second terminal of the driving circuit from the output signal terminal by the light-emitting control circuit, and providing the signal of the data signal terminal to the second terminal of the driving circuit by the writing circuit; and in a light-emitting phase, decoupling the first voltage terminal from the output signal terminal and decoupling the output signal terminal from the control terminal of the driving circuit by the second compensation circuit, electrically coupling the first terminal of the driving circuit to the power signal terminal and electrically coupling the second terminal of the driving circuit to the output signal terminal by the light-emitting control circuit, and generating the driving current flowing through the second terminal of the driving circuit by the driving circuit.

17. The method according to claim 16, further comprising: in a reset phase before the compensation phase, electrically coupling the second terminal of the driving circuit to the output signal terminal by the light-emitting control circuit, electrically coupling the control terminal of the driving circuit to the first terminal of the driving circuit by the first compensation circuit, and providing the voltage of the first voltage terminal to the output signal terminal and electrically coupling the output signal terminal to the control terminal of the driving circuit by the second compensation circuit.

18. The method according to claim 17, further comprising: in the reset phase, electrically coupling, by the light-emitting control circuit, the power signal terminal to the first terminal of the driving circuit;

wherein the pixel circuit further comprises a third compensation circuit, and the method further comprises: in the reset phase, decoupling, by the light-emitting control circuit, the power signal terminal from the first terminal of the driving circuit; and providing, by the third compensation circuit, a voltage of a second voltage terminal to the first terminal of the driving circuit.

19. The method according to claim 16, wherein the third control signal terminal and the fourth control signal terminal are separated from each other so as to receive a third control signal and a fourth control signal, respectively; and wherein in the light-emitting phase, by the second compensation circuit decouples the first voltage terminal from the output signal terminal according to the third control signal, and decouples the output signal terminal from the control terminal of the driving circuit according to the fourth control signal;

wherein in the light-emitting phase, the second compensation circuit decouples the output signal terminal from the control terminal of the driving circuit before decoupling the first voltage terminal from the output signal terminal.

20. The method according to claim 16, wherein the third control signal terminal and the fourth control signal terminal are coupled to each other so as to receive a third control signal; and wherein in the light-emitting phase, the second compensation circuit decouples the first voltage terminal from the output signal terminal according to third control signal, and decouples the output signal terminal from the control terminal of the driving circuit according to the third control signal.

* * * * *